United States Patent
Wang et al.

(10) Patent No.: US 11,474,970 B2
(45) Date of Patent: Oct. 18, 2022

(54) ARTIFICIAL REALITY SYSTEM WITH INTER-PROCESSOR COMMUNICATION (IPC)

(71) Applicant: Meta Platforms Technologies, LLC, Menlo Park, CA (US)

(72) Inventors: Jun Wang, San Jose, CA (US); Neeraj Upasani, Redmond, WA (US); Wojciech Stefan Powiertowski, Kirkland, WA (US); Drew Eric Wingard, Palo Alto, CA (US); Gregory Edward Ehmann, Sleepy Hollow, IL (US); Marco Brambilla, Campbell, CA (US); Minli Lin, San Jose, CA (US); Miguel Angel Guerrero, Palo Alto, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 305 days.

(21) Appl. No.: 16/726,492

(22) Filed: Dec. 24, 2019

(65) Prior Publication Data
US 2021/0089366 A1 Mar. 25, 2021

Related U.S. Application Data

(60) Provisional application No. 62/905,095, filed on Sep. 24, 2019.

(51) Int. Cl.
*G06F 15/163* (2006.01)
*H04N 13/344* (2018.01)
(Continued)

(52) U.S. Cl.
CPC .......... *G06F 15/163* (2013.01); *G06F 15/167* (2013.01); *G06F 15/17325* (2013.01); *H04N 13/344* (2018.05)

(58) Field of Classification Search
CPC ............. G06F 15/163; G06F 15/167; G06F 15/17325; G06F 3/0659; G06F 13/24; H04N 13/344
See application file for complete search history.

(56) References Cited

U.S. PATENT DOCUMENTS 5,136,714 A 8/1992 Braudaway et al.
5,214,759 A * 5/1993 Yamaoka .............. G06F 15/167
709/213

(Continued)

FOREIGN PATENT DOCUMENTS

| AU | 2004297922 B2 | 7/2008 |
| WO | 2005/057964 A1 | 6/2005 |
| WO | 2012/061151 A1 | 5/2012 |

OTHER PUBLICATIONS

"Announcing the Advanced Encryption Standard (AES)," Federal Information Processing Standards Publication 197, Nov. 26, 2001, 51 pp.

(Continued)

*Primary Examiner* — Brian W Wathen
(74) *Attorney, Agent, or Firm* — Shumaker & Sieffert, P.A.

(57) ABSTRACT

The disclosure describes techniques for interrupt and inter-processor communication (IPC) mechanisms that are shared among computer processors. For example, an artificial reality system includes a plurality of processors; an inter-processor communication (IPC) unit comprising a register, wherein the IPC unit is configured to: receive a memory access request from a first processor of the processors, wherein the memory access request includes information indicative of a hardware identifier (HWID) associated with the first processor; determine whether the HWID associated with the first processor matches an HWID for the register of the IPC unit; and permit, based on determining that the (Continued)

HWID associated with the first processor matches the HWID for the register of the IPC unit, the memory access request to indicate a communication from the first processor to at least one other processor.

20 Claims, 11 Drawing Sheets

(51) Int. Cl.
*G06F 15/173* (2006.01)
*G06F 15/167* (2006.01)

(56) References Cited

U.S. PATENT DOCUMENTS

| | | | |
|---|---|---|---|
| 5,617,537 A * | 4/1997 | Yamada | G06F 15/17 709/201 |
| 6,456,628 B1 | 9/2002 | Greim et al. | |
| 7,302,548 B1 * | 11/2007 | Mitten | G06F 15/167 712/34 |
| 7,711,443 B1 | 5/2010 | Sanders et al. | |
| 3,244,305 A1 | 8/2012 | Ramesh et al. | |
| 9,032,128 B2 | 5/2015 | Bonola | |
| 9,111,548 B2 | 8/2015 | Nandy et al. | |
| 10,241,941 B2 | 3/2019 | Fader et al. | |
| 10,372,656 B2 | 8/2019 | Varadarajan et al. | |
| 2002/0091826 A1 * | 7/2002 | Comeau | G06F 9/546 709/226 |
| 2003/0031320 A1 | 2/2003 | Fan et al. | |
| 2005/0111472 A1 | 5/2005 | Krischer et al. | |
| 2005/0169483 A1 | 8/2005 | Malvar et al. | |
| 2005/0244018 A1 | 11/2005 | Fischer et al. | |
| 2006/0014522 A1 | 1/2006 | Krischer et al. | |
| 2008/0209203 A1 | 8/2008 | Haneda | |
| 2010/0111329 A1 | 5/2010 | Namba et al. | |
| 2015/0112671 A1 | 4/2015 | Johnston et al. | |
| 2015/0134765 A1 * | 5/2015 | Holmberg | G06F 15/17331 709/212 |
| 2015/0213811 A1 | 7/2015 | Elko et al. | |
| 2015/0355800 A1 | 12/2015 | Cronin | |
| 2016/0055106 A1 * | 2/2016 | Ansari | G06F 9/4812 710/266 |
| 2016/0134966 A1 | 5/2016 | Fitzgerald et al. | |
| 2018/0122271 A1 | 5/2018 | Ghosh et al. | |
| 2018/0145951 A1 | 5/2018 | Varadarajan et al. | |
| 2019/0289393 A1 | 9/2019 | Amarilio et al. | |
| 2019/0335287 A1 | 10/2019 | Jung et al. | |
| 2020/0027451 A1 | 1/2020 | Cantu | |
| 2021/0011556 A1 | 1/2021 | Atlas et al. | |
| 2021/0089475 A1 | 3/2021 | Mathur et al. | |

OTHER PUBLICATIONS

Qiu et al., "Low-Power Low-Latency Data Allocation for Hybrid Scratch-Pad Memory," IEEE Embedded Systems Letters vol. 6, Issue: 4, Dec. 2014, pp. 69-72.
U.S. Appl. No. 16/738,247, filed Jan. 9, 2019, by Mathur.
U.S. Appl. No. 16/860,991, filed Apr. 28, 2020, by Patil et al.
U.S. Appl. No. 16/860,983, filed Apr. 28, 2020, by Patil et al.
McGrew et al., "The Galois/Counter Mode of Operation (GCM)," Conference Proceedings, May 31, 2015, 44 pp.
Kite, "Understanding PDM Digital Audio," Audio Precision Inc., Jan. 11, 2012, 9 pp.
Waterman et al., "The RISC-V Instruction Set Manual, vol. II: Privileged Architecture. Version 1.10 Chapter 7," May 7, 2017, 13 pp.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
"SMS4 Encryption Algorithm for Wireless Networks," Version 1.03, May 15, 2008, 5 pp. (translated by Diffie et al.).
Aoki et al., "Specification of Camellia—a 128-bit Block Cipher," NTT and Mitsubishi Electric Corporation, Sep. 26, 2001, 35 pp.
International Search Report and Written Opinion of International Application No. PCT/US2020/047564, dated Feb. 1, 2021, 19 pp.
International Preliminary Report on Patentability for International Application No. PCT/US2020/047564, dated Apr. 7, 2022, 16 pages.
Adiono T., et al., "An Inter-Processor Communication (IPC) Data Sharing Architecture in Heterogeneous MPSoC for OFDMA," Journal of Information and Communication Technology (JICT), 2018, vol. 12, No. 1, pp. 70-86.
Notice of Allowance dated Mar. 18, 2022 for U.S. Appl. No. 17/303,697, filed Jun. 4, 2021, 15 pages.

* cited by examiner

ARTIFICIAL REALITY SYSTEM WITH INTER-PROCESSOR COMMUNICATION (IPC)

This application claims the benefit of U.S. Provisional Application No. 62/905,095 filed Sep. 24, 2019, the entire content of which being herein incorporated by reference.

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments.

SUMMARY

In general, the disclosure describes techniques for inter-processor communication (IPC) mechanisms that are shared among computer processors. In particular, the application will describe one or more System-on-Chip (SoC) integrated circuits comprising a plurality of processors, a network-on-chip (NoC), and an IPC unit. Each of the processors may use registers of the IPC unit to (1) initiate an interrupt request for a target processor or (2) to acquire a lock for a shared resource (e.g., memory, I/O device).

In one example, the IPC unit includes an address map comprising a plurality of doorbell registers, each of the doorbell registers corresponding to a different pair of the processors. Sets of doorbell registers may be associated with different target processors and associated with interrupt request (IRQ) lines for the processors. A security processor configures the pair of processors (e.g., source processor and target processor) for each doorbell register, at boot time for instance. To generate an interrupt to a target processor, a source processor sends a memory access request including a hardware identifier (HWID) of the source processor, via the NoC, to write a value (e.g., '1') to the doorbell register that corresponds to the source processor, target processor pair. The IPC unit determines whether the HWID of the source processor included in the memory access request matches the HWID stored in the doorbell register at the memory location specified in the memory access request. If the HWIDs of the source processor and the doorbell register do not match, the IPC unit rejects the memory access request and an error is returned. The IPC unit may log the error, e.g., to the security processor. If the HWIDs of the source processor and the doorbell register match, the IPC unit writes the value to the doorbell register. Writing the value to the doorbell register triggers an interrupt, e.g., raising an interrupt request (IRQ) input, to the target processor. Once the target processor completes processing of the interrupt request, the target processor sends a second memory access request to write a value (e.g., '0') to the same doorbell register to clear the doorbell register for another interrupt request. In some examples, only the source processor can write a value to the doorbell register for a source processor, target processor pair, and only the target processor can clear the value from that doorbell register.

In another example, the above-described IPC unit includes a plurality of hardware mutual exclusion (mutexes) registers, each used to prevent simultaneous access to a corresponding shared resource (e.g., memory, I/O devices). To use a resource, a first process running on a first processor must acquire ownership of a mutex object (referred to herein as simply a "mutex") corresponding to that resource. To acquire ownership of the mutex, the first process attempts to write, using a memory access request via the NoC, a value (e.g., '1') and its software ID (SWID) to the mutex register. The first processor inserts its HWID into the memory access request. If the acquisition succeeds (e.g., because no other process owns the mutex), the IPC unit stores the value, the SWID of the first process, and the HWID of the first processor in the mutex register. If the acquisition fails (e.g., because another process owns the mutex), no error will be returned. The first process will then read the data stored in the mutex register. For example, if an SWID of another process is stored in the mutex register, then the first process does not own the mutex and cannot use the resource. If the SWID of the first process is stored in the mutex register, the first process owns the mutex and can use the resource. To release the mutex (and the resource), the first process issues, via the NoC, a memory access request to write a value (e.g., '0') to the mutex register to clear it. In some examples, only the process that owns the mutex object can clear it (e.g., the HWID and SWID of the write request must match what is stored in the mutex register). If a processor having an HWID attempts to clear a mutex register storing a different HWID, the IPC unit may register an error with the security processor.

In one example, an artificial reality system includes a plurality of processors. The artificial reality system also includes an inter-processor communication (IPC) unit comprising a register, wherein the IPC unit is configured to: receive a memory access request from a first processor of the processors, wherein the memory access request includes information indicative of a hardware identifier (HWID) associated with the first processor; determine whether the HWID associated with the first processor matches an HWID for the register of the IPC unit; and permit, based on determining that the HWID associated with the first processor matches the HWID for the register of the IPC unit, the memory access request to indicate a communication from the first processor to at least one other processor.

In another example, a method for inter-processor communication (IPC) includes receiving a memory access request from a first processor of a plurality of processors, wherein the memory access request includes information indicative of a hardware identifier (HWID) associated with the first processor. The method also includes determining whether the HWID associated with the first processor matches an HWID for the register of the IPC unit. The method further includes permitting, based on determining that the HWID associated with the first processor matches the HWID for the register of the IPC unit, the memory access request to indicate a communication from the first processor to at least one other processor.

In yet another example, a computer-readable storage medium includes instructions that, when executed, configure processing circuitry to: receive a memory access request from a first processor of a plurality of processors, wherein the memory access request includes information indicative of a hardware identifier (HWID) associated with the first processor; determine whether the HWID associated with the first processor matches an HWID for the register of the IPC unit; and permit, based on determining that the HWID associated with the first processor matches the HWID for the register of the IPC unit, the memory access request to indicate a communication from the first processor to at least one other processor.

The details of one or more examples of the techniques described herein are set forth in the accompanying drawings and the description below. Other features, objects, and advantages of the techniques described herein will be apparent from the description and drawings, and from the claims.

BRIEF DESCRIPTION OF DRAWINGS

Like reference characters refer to like elements throughout the figures and text.

DETAILED DESCRIPTION

Figure 1A:
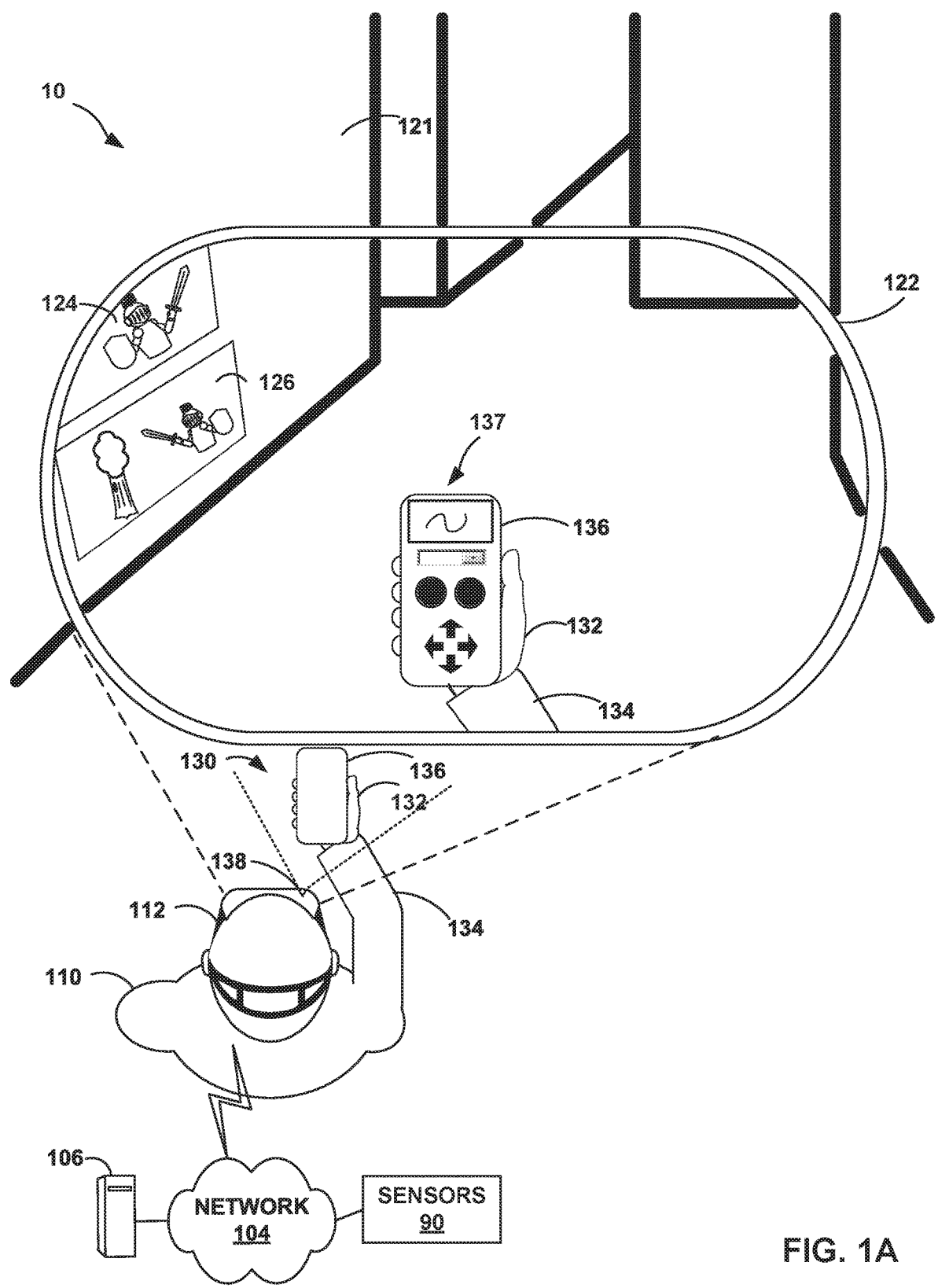
FIG. 1A is an illustration depicting an example artificial reality system that provides inter-processor communication (IPC) mechanisms that are shared among computer processors, in accordance with the techniques described in this disclosure.

FIG. 1A is an illustration depicting an example artificial reality system that provides inter-processor communication (IPC) mechanisms that are shared among computer processors, in accordance with the techniques described in this disclosure. In the example of FIG. 1A, artificial reality system 10 includes HMD 112, peripheral device 136, and may in some examples include one or more external sensors 90 and/or console 106.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on a surface of a physical object).

In this example, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smartring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction in the AR environment, where each device may be a separate physical electronic device and/or separate integrated circuits (e.g., System on a Chip (SoC)) within one or more physical devices. In this example, peripheral device 136 is operationally paired with HMD 112 to jointly operate within AR system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the AR system 10 detects the user interface and performs an action that is rendered to HMD 112.

In accordance with the techniques of this disclosure, artificial reality system 10 may provide inter-processor communication (IPC) mechanisms that are shared among computer processors of devices, such as peripheral device 136 and/or HMD 112. Although the techniques are described herein with respect to interrupt and IPC mechanisms that are used by computer processors of peripheral device 136 and/or HMD 112 for IPC, the techniques may be used by other hardware components of peripheral device 136 and/or HMD 112, such as for IPC between SoCs or between sub-systems of an SoC (a sub-system may include one or more processors).

In some example implementations, as described herein, peripheral device 136 and HMD 112 may each include one or more SoC integrated circuits configured to support an artificial reality application, such as SoCs operating as co-application processors, sensor aggregators, display controllers, etc. SoCs may comprise a plurality of processors, a network-on-chip (NoC) and an IPC unit. Processors may include computer processing units (CPUs) (e.g., Reduced Instruction Set Computer (RISC), Advanced RISC machines (ARM), Complex Instruction Set Computer (CISC), etc.), digital signal processors (DSPs), convolutional neural network (CNN) processors, or the like. An NoC is a communication infrastructure that enables data communications between components of one or more SoCs. Such components may include sub-systems of an SoC, processors of a sub-system, other processors of an SoC, and the IPC unit.

As further described below, an IPC unit provides IPC mechanisms for one processor of an SoC to notify another processor of the SoC of available communications or that a shared resource is currently in use. In some examples, a processor may store data in one or more memory locations and signal other processors via the NoC that the data is available to process. This is referred to as "doorbell." For example, a source processor may write data to a memory location and "ring the doorbell" by writing to a different memory location, referred to as a doorbell register. By writing to the doorbell register, an interrupt is triggered to one or more target processors to indicate the data is available to process. As described in further detail herein, a device such as HMD 112 and/or peripheral device 136 may include a plurality of doorbell registers, each used to initiate an interrupt request to a target processor.

In some examples, a processor may request access to a shared resource (e.g., memory, I/O devices) and, upon acquiring ownership of the shared resource, prevent simultaneous access to the shared resource by other processors. This is referred to as "mutual exclusion" or "mutex" where a processor may acquire ownership of a mutex corresponding to the shared resource. For example, a first processor (e.g., central processing unit (CPU)) and a second processor (e.g., graphics processor unit (GPU)) of peripheral device 136 may share memory, and only the processor with the ownership of the mutex may access to the shared memory. As described in further detail herein, a device such as HMD 112 and/or peripheral device 136 may include a plurality of hardware mutual execution registers ("mutex registers"), each used to prevent simultaneous access to a shared resource. A processor executing on the device may attempt to acquire a mutex by attempting to write, to a mutex register for a shared resource, a unique hardware identifier for the processor (HWID) and a software identifier for a process (SWID). If the acquisition succeeds, the mutex register stores the HWID and SWID. Based on this state of the mutex register, the processor and other processors of the device can determine ownership of the mutex and in this way control access to the corresponding shared resource.

Figure 1B:
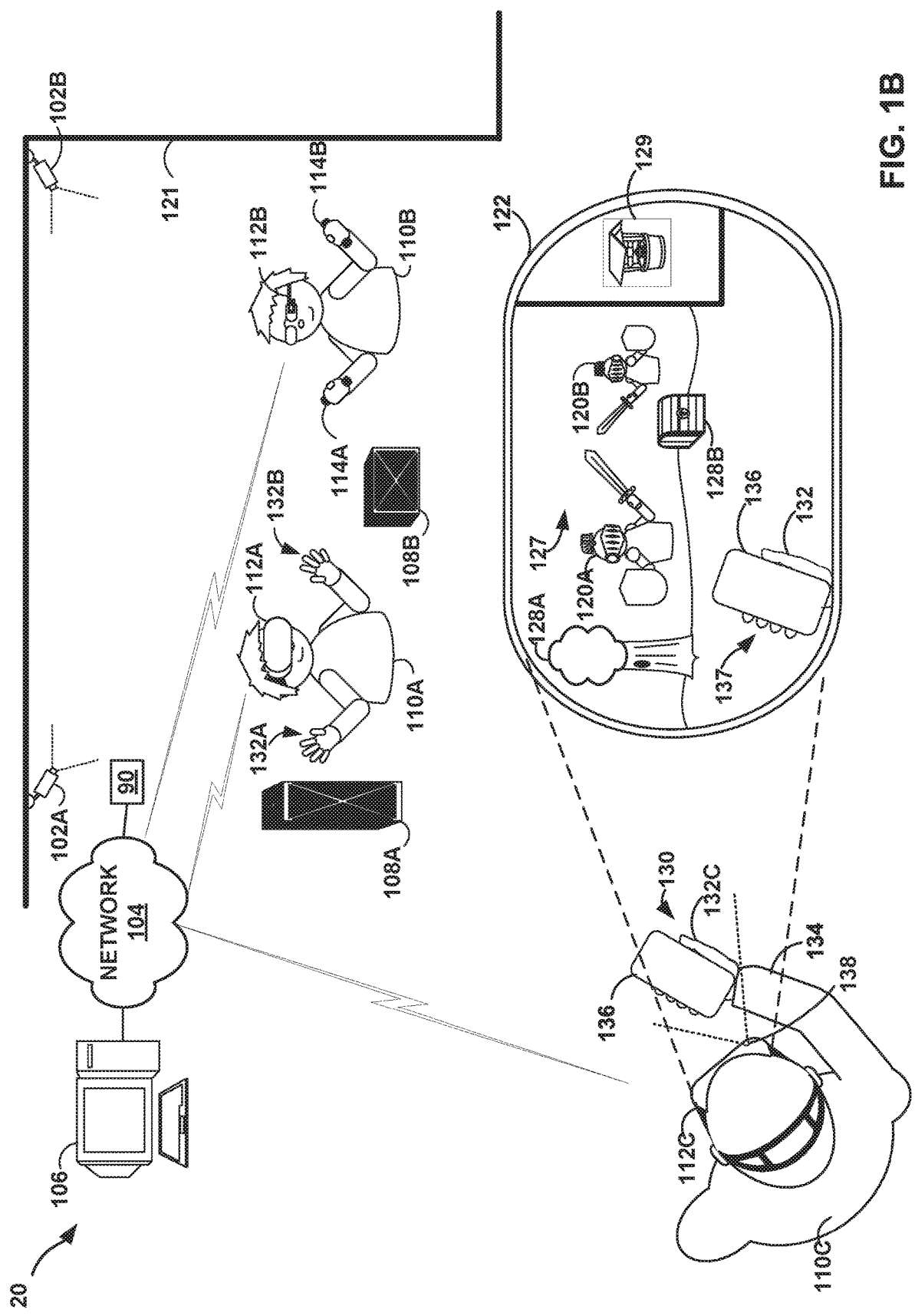
FIG. 1B is an illustration depicting another example artificial reality system that provides inter-processor communication mechanisms that are shared among computer processors, in accordance with techniques described in this disclosure.

FIG. 1B is an illustration depicting another example artificial reality system 20 that provides interrupt and interprocessor communication mechanisms that are shared among computer processors, in accordance with the techniques described in this disclosure. In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real-world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

As shown in FIG. 1B, in addition to or alternatively to image data captured via camera 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand. In some aspects, the artificial reality application can run on console 106, and can utilize image capture devices 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render artificial reality content. Artificial reality content may include virtual content items and/or UI elements, responsive to such gestures, motions, and orientations, such as that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is paired with HMD 112C to jointly operate within AR system 20. Similarly, controllers 114 are paired with HMD 112B to jointly operate within AR system 20. Peripheral device 136, HMDs 112, and/or controllers 114 may each include one or more SoC integrated circuits configured to enable an operating environment for artificial reality applications.

Similar to the example described in FIG. 1A, IPC unit of SoCs may enable processors to perform inter-processor communication, such as for doorbells and/or mutexes. As described in further detail below, the IPC unit provides IPC mechanisms for one processor of an SoC to notify another processor of the SoC of available communications (e.g., doorbell). For instance, a device such as HMDs 112 and/or peripheral device 136 may include a plurality of doorbell registers, each configured with a pair of processors (e.g., source processor and target processor). Each of the doorbell registers may be used to initiate an interrupt request to a target processor. In some examples, a processor may request access to a shared resource (e.g., memory, I/O devices) and, upon acquiring ownership of the shared resource, prevent simultaneous access to the shared resource by other processors (e.g., mutex). For example, a device such as HMDs 112 and/or peripheral device 136 may include a plurality of mutex registers, each used to prevent simultaneous access to a shared resource. Based on the state of the mutex register, the processor and other processors of the device can determine ownership of the mutex and in this way control access to the corresponding shared resource.

Figure 2A:
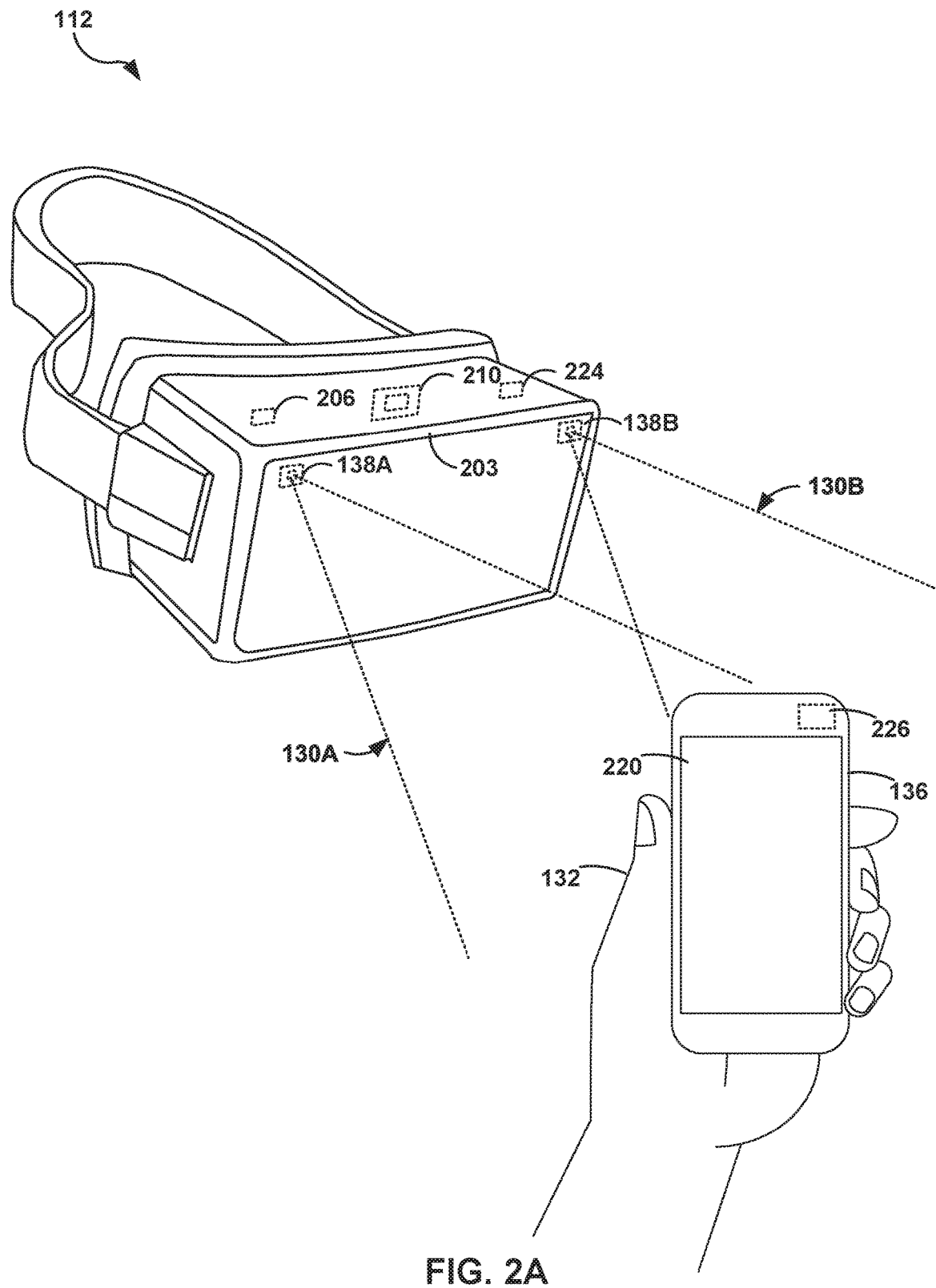
FIG. 2A is an illustration depicting an example HMD that provides inter-processor communication mechanisms that are shared among computer processors, in accordance with techniques described in this disclosure.

FIG. 2A is an illustration depicting an example HMD 112 and an example peripheral device 136 that provides interrupt and inter-processor communication mechanisms that are shared among computer processors, in accordance with techniques described in this disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, HMD 112 includes an IPC unit 224 that provides inter-processor communication mechanisms that are shared among computer processors. Similarly, peripheral device 136 includes an IPC unit 226 that provides inter-processor communication mechanisms that are shared among computer processors.

IPC units 224 and 226 may each implement doorbells and/or mutexes to enable processors to perform inter-processor communication. Similar to the examples described in FIGS. 1A and 1B, IPC units 224 and 226 may each provide IPC mechanisms for one processor of an SoC to notify another processor of the SoC of available communications (e.g., doorbell). For instance, HMD 112 may include a plurality of doorbell registers, each configured with a pair of processors (e.g., source processor and target processor of HMD 112). IPC unit 224 of HMD 112 may use the doorbell registers to initiate an interrupt request to a target processor of HMD 112. Similarly, peripheral device 136 may include a plurality of doorbell registers, each configured with a pair of processors. IPC unit 226 of peripheral device 136 may use the doorbell registers to initiate an interrupt request to a target processor of peripheral device 136.

In some examples, a processor may request mutually exclusive access to a shared resource (e.g., mutex). In the example of FIG. 2A, processors of HMD 112 and/or peripheral device 136 may each try to access a resource at different times or coincidentally. For example, the memory of peripheral device 136 may store data captured by HMD 112 and/or peripheral device 136. In this example, a processor of HMD 112 may request mutually exclusive access to the shared memory in peripheral device 136. As described above and further below, HMD 112 may include a plurality of mutex registers, each used to prevent simultaneous access to a shared resource. To use a shared resource such as the memory in HMD 112, a first process running on a first processor of HMD 112 must acquire ownership of a mutex of a mutex register corresponding to that resource. Based on the state of the mutex register, the processor and other processors of HMD 112 can determine ownership of the mutex and in this way control access to the corresponding shared resource.

Figure 2B:
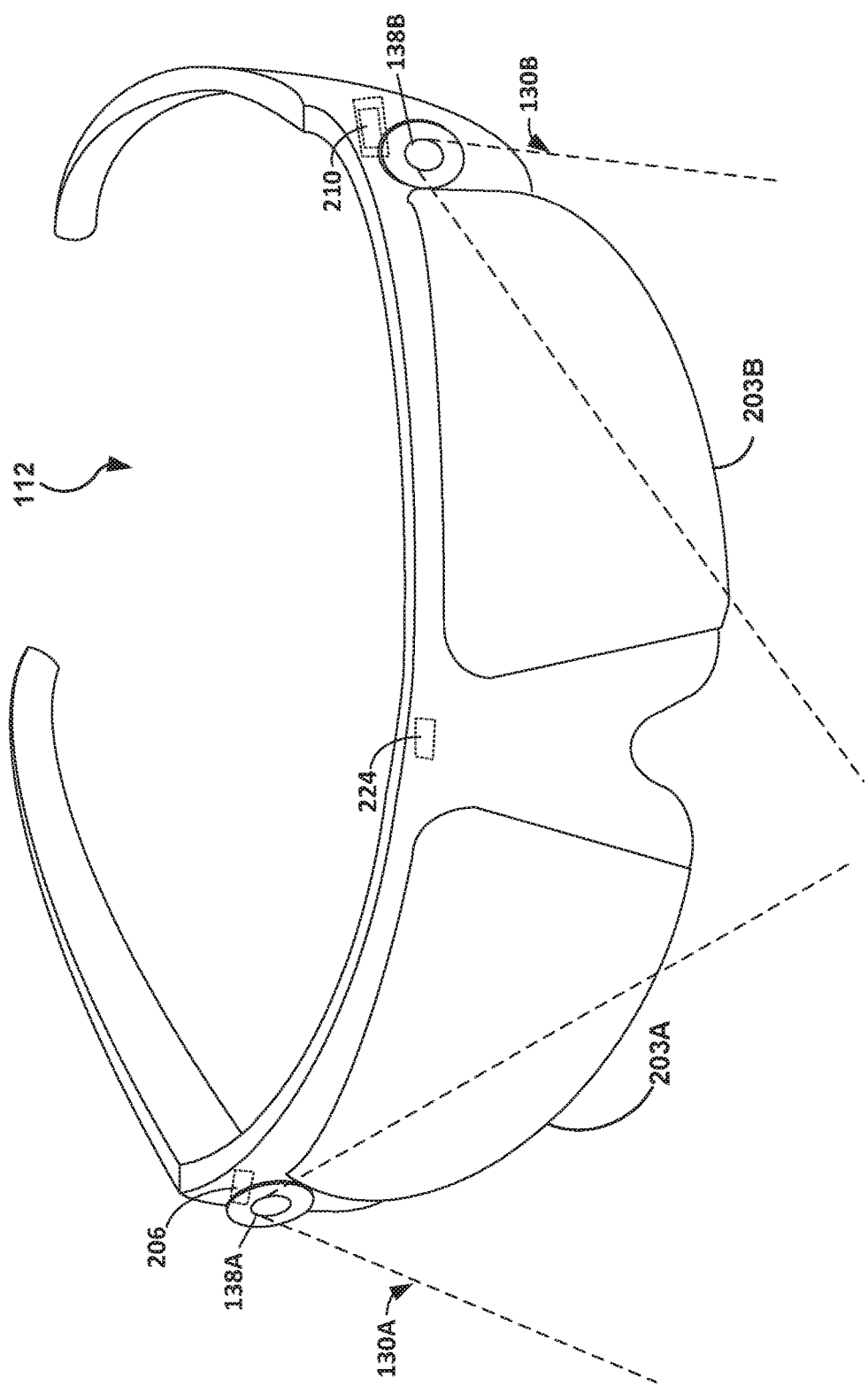
FIG. 2B is an illustration depicting another example HMD that provides inter-processor communication mechanisms that are shared among computer processors, in accordance with techniques described in this disclosure.

FIG. 2B is an illustration depicting another example HMD 112, in accordance with techniques described in this disclosure. FIG. 2B illustrates an HMD 112 having a glasses form factor. HMD 112 of FIG. 2B may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein. HMD 112 of FIG. 2B may communicate with a peripheral device (not shown in FIG. 2B).

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Similar to the example illustrated in FIG. 2A, HMD 112 includes an IPC unit 224 that provides inter-processor communication mechanisms that are shared among computer processors. IPC unit 224 enables processors of HMD 112 may implement doorbells and/or mutexes to enable processors to perform inter-processor communication. Similar to the example described in FIG. 2A, IPC unit 224 may each provide IPC mechanisms for one processor of an SoC to notify another processor of the SoC of available communications (e.g., doorbell). For instance, HMD 112 may include a plurality of doorbell registers, each configured with a pair of processors (e.g., source processor and target processor of HMD 112). IPC unit 224 of HMD 112 may use the doorbell registers to initiate an interrupt request to a target processor of HMD 112.

In some examples, a processor may request mutually exclusive access to a shared resource (e.g., mutex). In the example of FIG. 2B, processors of HMD 112 may each try to access a shared resource (e.g., of HMD 112 or a peripheral device 136). For example, the memory of HMD 112 may store data captured by HMD 112 and/or other devices. In this example, a processor of HMD 112 may request mutually exclusive access to the shared memory. As described above and further below, to use a shared resource, HMD 112 may include a plurality of mutex registers, each used to prevent simultaneous access to a shared resource. To use a shared resource such as the memory in HMD 112, a first process running on a first processor of HMD 112 must acquire ownership of a mutex of a mutex register corresponding to that resource. Based on the state of the mutex register, the processor and other processors of HMD 112 can determine ownership of the mutex and in this way control access to the corresponding shared resource.

Figure 3:
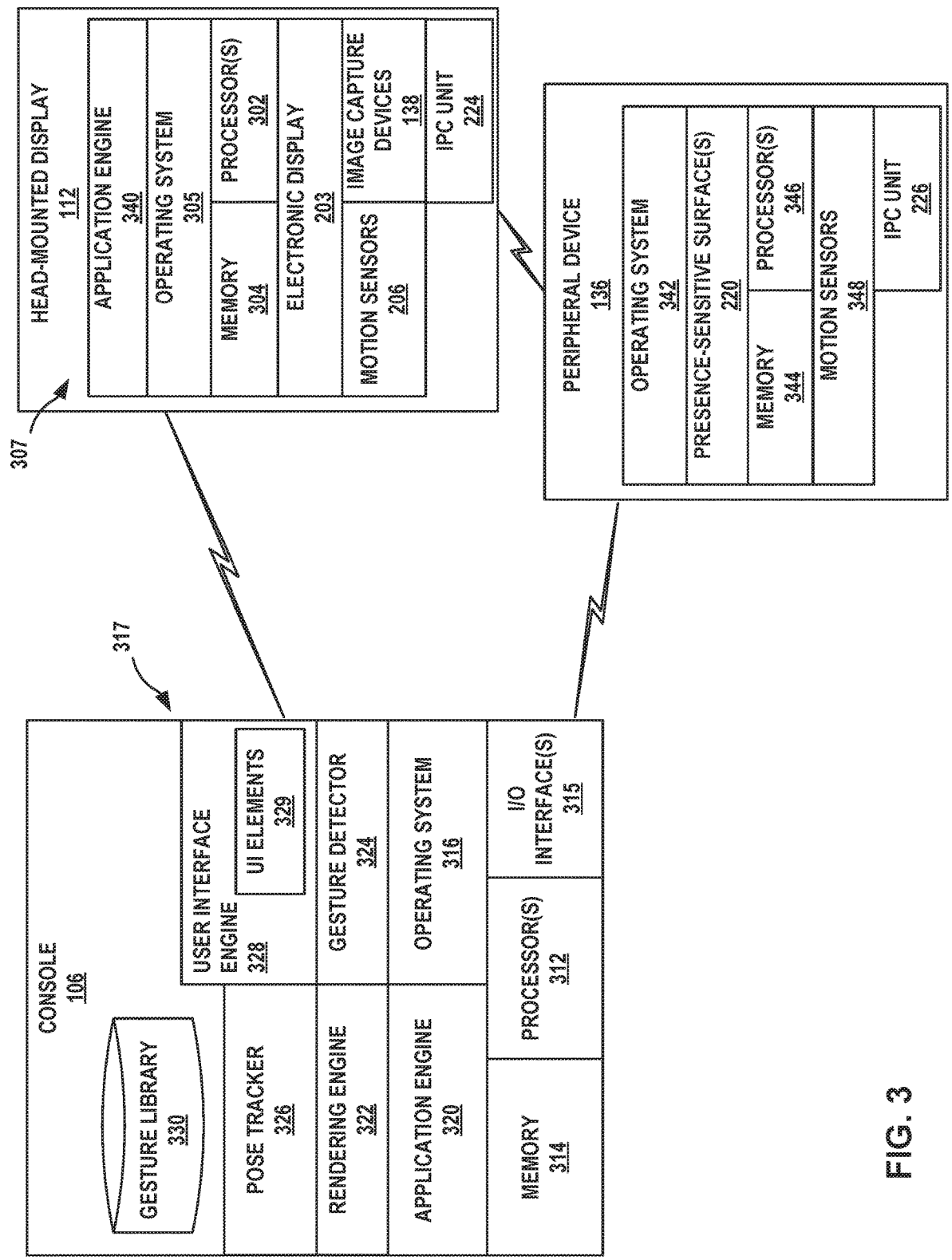
FIG. 3 is a block diagram showing example implementations of a console, an HMD, and a peripheral device of the multi-device artificial reality systems of FIGS. 1A, 1B, in accordance with techniques described in this disclosure.

FIG. 3 is a block diagram showing example implementations of console 106, HMD 112, and peripheral device 136 of multi-device artificial reality system 10, 20 of FIGS. 1A, 1B, in accordance with techniques described in this disclosure. In the example of FIG. 3, console 106 performs pose tracking, gesture detection, and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit. As discussed with respect to the example of FIGS. 2A and 2B, processors 302 include a security processor 224 to provide secure device attestation and mutual authentication of HMD 112 when pairing with devices, e.g., peripheral device 136, used in conjunction within the AR environment. Each of software components 307 and processes executed by HMD 112 may have a different software identifier. Processes executed by processors of peripheral device 136 may also have different software identifiers. Software identifiers for processes may be unique among processes executed by any device of the artificial reality system 10.

In general, console 106 is a computing device that processes image and tracking information received from cameras 102 (FIG. 1B) and/or image capture devices 138 HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine. Each of software applications 317 and other processes executed by console 106 may have a different software identifier.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for peripheral device 136 and/or HMD 112. User interface engine 328 is configured to generate virtual user interfaces for rendering at HMD 112 in an artificial reality environment. User interface engine 328 may generate a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth. Rendering engine 322 is configured to render virtual user interface and other artificial reality content for display at HMD 112 in the artificial reality environment.

Console 106 may output artificial reality content, via a communication channel, to HMD 112 for display at HMD 112. Rendering engine 322 may receive pose information for HMD 112 and/or peripheral device 136 to update the pose rendering of artificial reality content to the pose.

Based on the sensed data from any of the image capture devices 138 or 102, presence-sensitive surfaces 220, or other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of peripheral device and process the user inputs to detect one or more gestures performed by user 110 with respect to peripheral device 136.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console 106 and/or HMD 112 to cause the console 106 and/or HMD 112 to responsively perform one or more actions. Peripheral device 136 may alternatively, or additionally, send indications of the user inputs at locations of the surface to console 106, and gesture detector 324 may process the user inputs to detect one or more gestures of gesture library 330.

Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time. Some entries in gesture library 330 may each define a gesture as one or more user inputs, over time, detected by presence-sensitive surface(s) 220 of peripheral device 136. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting virtual objects (including virtual content items and/or UI elements), translating (e.g., moving, rotating) virtual objects, altering (e.g., scaling, annotating) virtual objects, making virtual markings, launching applications, and the like.

As an example, gesture library 330 may include entries that describe a peripheral device gesture, such as user interface activation gesture, a menu scrolling gesture, a selection gesture, a stamping gesture, a translation gesture, rotation gesture, drawing gesture, and/or pointing gesture. Gesture detector 324 may process image data from image capture devices 138 to analyze configurations, positions, motions, and/or orientations of peripheral device 136 and/or a user's hand to identify a user interface gesture, selection gesture, stamping gesture, translation gesture, rotation gesture, drawing gesture, pointing gesture, etc. that may be performed by users with respect to peripheral device 136. For example, the rendering engine 322 can render a pinboard user interface based on detecting, by the gesture detector 324, of the user interface gesture being performed and detecting, by the pose tracker 326, that the HMD 112 is proximate to a physical position corresponding to a virtual position of the virtual pinboard. The user interface engine 328 can define the menu that is displayed and can control actions that are performed in response to selections caused by selection gestures.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can comprise a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

In accordance with the techniques described herein, the multi-device artificial reality system of FIG. 3 provides inter-processor communication mechanisms that are shared among processors. For example, as discussed in greater detail herein, peripheral device 136 may include IPC unit 226 to provide inter-processor communication mechanisms, such as doorbells and mutexes, for processors of peripheral device 136 and processors of other devices of the AR system, e.g., HMD 112 and/or console 106, used in conjunction within the AR environment. Similarly, IPC unit 224 of HMD 112 may provide inter-processor communication mechanisms, such as doorbells and mutexes, for processors of HMD 112 and processors of other devices of the AR system, e.g., peripheral device 136 and/or console 106, used in conjunction within the AR environment.

Figure 4:
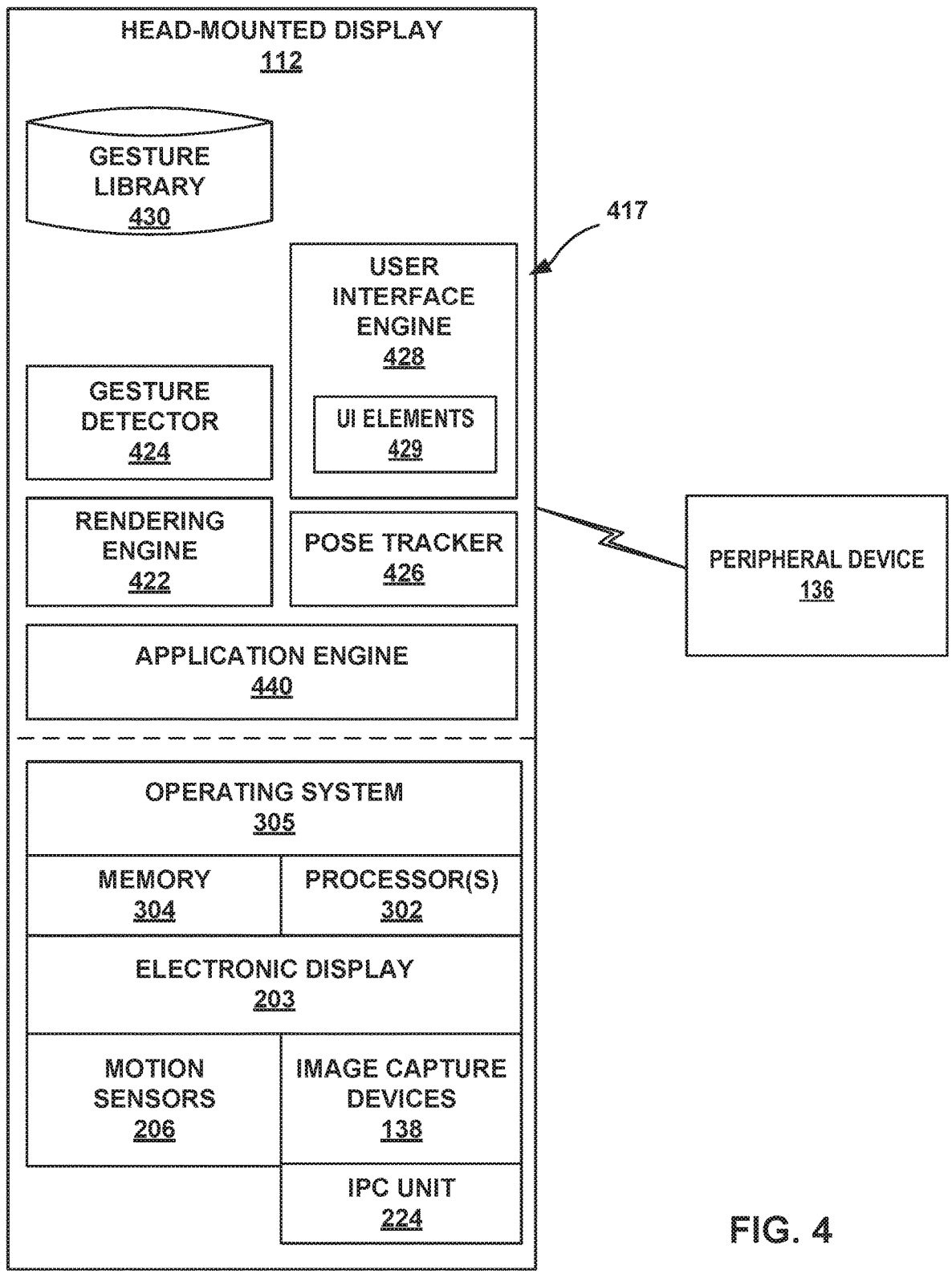
FIG. 4 is a block diagram depicting an example implementation of an HMD, and a peripheral device of the artificial reality systems of FIGS. 1A, 1B, in accordance with the techniques described in this disclosure.

FIG. 4 is a block diagram depicting an example implementation of an HMD, and a peripheral device of the artificial reality systems of FIGS. 1A, 1B, in accordance with the techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, presence-sensitive surfaces of peripheral device 136, or other sensor devices, gesture detector 424 analyzes the tracked motions, configurations, positions, and/or orientations of peripheral device 136 and/or objects (e.g., hands, arms, wrists, fingers, palms, thumbs) of the user to identify one or more gestures performed by user 110.

More specifically, gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. Gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 424 may track movement, including changes to position and orientation, of the peripheral device 136, hand, digits, and/or arm based on the captured image data, and compare motion vectors of the objects to one or more entries in gesture library 430 to detect a gesture or combination of gestures performed by user 110. In some examples, gesture detector 424 may receive user inputs detected by presence-sensitive surface(s) of peripheral device and process the user inputs to detect one or more gestures performed by user 110 with respect to peripheral device 136. Gesture library 430 is similar to gesture library 330 of FIG. 3. Some of all of the functionality of gesture detector 424 may be executed by peripheral device 136.

Similar to the example described with respect to FIG. 3, HMD 112 includes an inter-processor communication (IPC) unit 224 that provides inter-processor communication (e.g., via doorbells and/or mutexes) between processors 302 of HMD 112 or to processors of other devices (e.g., peripheral device 136) of the AR system.

Figure 5A:
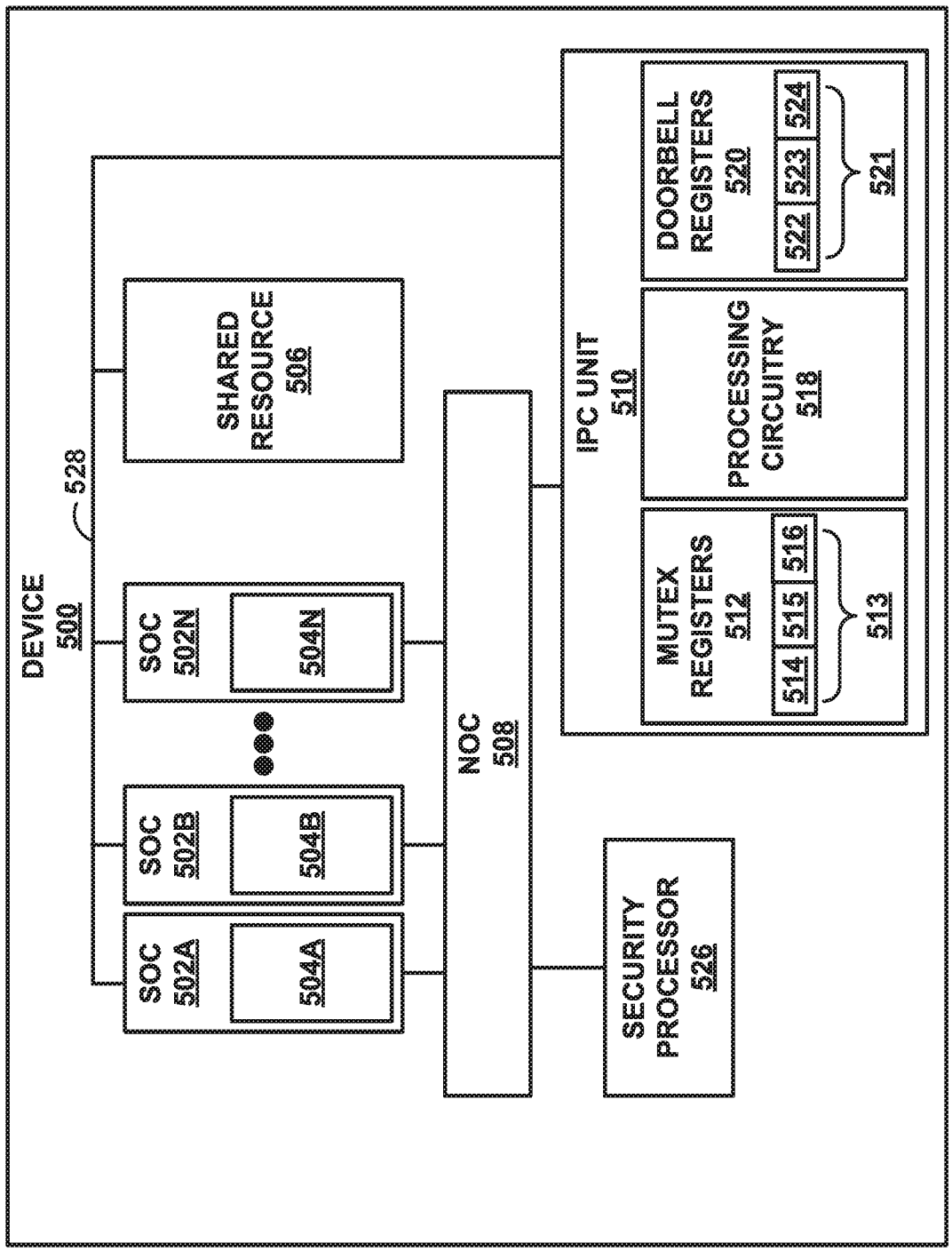
FIG. 5A is a block diagram showing an example implementation in which multiple computer processors of SoCs use inter-processor communication, in accordance with the techniques described in this disclosure.

FIG. 5A is a block diagram showing an example implementation of a device 500 of an artificial reality system. Device 500 may be an example of HMDs 112 or peripheral device 136 of FIGS. 1A-4, or any device in the artificial reality system. Device 500 may be part of an artificial reality system, such as artificial reality systems 10, 20 of FIGS. 1A, 1B, or may operate as a stand-alone, mobile artificial reality system configured to implement the techniques described herein.

In this example, device 500 includes one or more systems-on-chip (SoCs) integrated circuits 502A-502N (collectively, "SoCs 502"), memory 506, network-on-chip (NoC) 508, and inter-processor communication (IPC) unit 510. In general, SoCs 502 represent a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components. Each of the functional blocks may be referred to as a subsystem or component of the SoC. More detailed example of SoCs are shown in FIG. 5C. Each of SoCs 502 may include one or more processors. In the example of FIG. 5A, SoCs 502 include respective processors 504A-504N (collectively, "processors 504"). Processors 504 may include central processing units CPUs, DSPs, CNN processors, GPUs, or other processing circuitry for executing instructions. Processors 504 and other components of SoCs 502 may communicate with one another using NoC 508. NoC 508 is a communication infrastructure comprising, e.g., shared busses between components of SoCs 502.

IPC unit 510 includes mutex registers 512, processing circuitry 518, and doorbell registers 520. SoCs 502 and security processor 526 operate in conjunction with IPC unit 510 to provide inter-processor communication, such as doorbell and/or mutex. Although IPC unit 510 is illustrated as including both mutex registers 512 and doorbell registers 520, IPC unit 510 may include only mutex registers 512, only doorbell registers 520, or both.

Doorbell registers 520 may represent a logical or physical writable register of a memory address map (e.g., 32-bit). Each doorbell register of doorbell registers 520 corresponds to a different pair of processors 504 included in SoCs 502. Sets of doorbell registers may be associated with different target processors and tied to interrupt request lines 529 for the processors. Security processor 526 may configure the pair of processors for each doorbell register of doorbell registers 520, at boot time for instance. For example, security processor 526 may configure a role identifier (ID) of each doorbell register for source processors and target processors.

In some examples, a group of registers of doorbell registers 520 is tied to a single target processor (e.g., one-to-one mapping), where interrupt request lines connect the source processor to the single target processor. In some examples, doorbell registers 520 may include multiple doorbell register groups (e.g., one-to-many mapping). The source processor, target processor pair of registers may be referred to as "security registers." For example, a single target processor may be mapped to a plurality of source processors for a doorbell register group, wherein the doorbell registers in the same group are tied a single target processor (e.g., output IRQs connected to interrupt controller inputs of target processor). An example of security registers for a doorbell register group is shown below:

| Security Register Address Offset | Register Name | Register width (bit) | Comment |
|---|---|---|---|
| 0x0000 | ERR_STATUS | 32 | Error log: status |
| 0x0004 | ERR_DATA | 32 | Error log: data |
| 0x0020 | TGT_ROLEID | 8 | Role ID of target CPU is shared by all doorbell register in the same group |

-continued

| Security Register Address Offset | Register Name | Register width (bit) | Comment |
|---|---|---|---|
| 0x0004 | SRC_ROLEID #0 | 8 | Role ID of source CPU for doorbells #0, #1, and so on. Upper 24-bit is reserved |
| 0x0008 | SRC_ROLEID #1 | 8 | |
| ... | ... | | |

For ease of illustration, only a single doorbell register group 521 is illustrated in FIG. 5A. IPC unit 510 provides inter-processor communication mechanisms for processors 504 of SoCs 502. For example, processors 504 of SoCs 502 may use IPC unit 510 to generate an interrupt (e.g., doorbell) for target processors 504. As one example, security processor 526 configures a doorbell register group 521 of doorbell registers 520 with a source processor 522, target processor 523 pair. In this example, security processor 526 configures doorbell register group 521 with a source processor, target processor pair (e.g., security register). For example, security processor 526 configures the security register of doorbell register group 521 with source processor 522 specified as an HWID of processor 504A and target processor 523 specified as an HWID of processor 504B. In some examples, other source processors are associated with target processor 523 and may be part of the doorbell register group.

Each doorbell register group is associated with a 1-bit function register that is a writable register having a memory-mapped address. The 1-bit function register may have output IRQ lines connected to target CPU's interrupt controller inputs. An example of the function register is shown below:

| Function Register Address Offset | Register Name | Register width (bit) | Comment |
|---|---|---|---|
| 0x1000 | DOORBELL #0 | 1 | Doorbell register |
| 0x1008 | DOORBELL #1 | 1 | |
| ... | | | |

To generate an interrupt to target processor 504B, source processor 504A sends a memory access request, via NoC 536, to write a value (e.g., '1') to a 1-bit function register 524 of doorbell register group 521 that corresponds to the source processor, target processor pair (e.g., source processor 522 and target processor 524). Source processor 504A includes the HWID of source processor 504A in the memory access request.

After IPC unit 510 receives the memory access request, IPC unit 510 determines whether the HWID of source processor 504A in the memory access request matches the HWID stored in doorbell registers 520. If the HWID of source processor 504A included in the memory access request does not match the HWID stored in doorbell registers 520, IPC unit 538 rejects the memory access request and an error is returned. IPC unit 510 may log the error, e.g., to security processor 526.

If the HWID of source processor 504A included in the memory access request matches the HWID stored in doorbell registers 520, IPC unit 510 writes a value (e.g., '1') to function register 524 of respective doorbell register group 521. By writing a value of '1' to function register 524, an interrupt request (IRQ) on the interrupt request lines 529 to one or many target processors may be generated. In some examples, each doorbell register of doorbell registers 520 is configured to output 1-bit interrupt requests to a corresponding target processor.

Once target processor 504B completes the processing of the interrupt request, target processor 504B may send a memory access request to write a value (e.g., '0') to the same doorbell register group (e.g., doorbell register group 521) and clear function register 524 of doorbell register group 521 for another interrupt request. For example, IPC unit 510 receives the memory access request from target processor 504B and may write '0' to function register 524 of doorbell register group 521. In some examples, only the source processor can write a '1' value to the doorbell register for a source processor, target processor pair, and only the target processor can clear the value from that doorbell register by writing a '0' value. IPC unit 510 enforces these write limitations on doorbell registers 520.

In some examples, each function register of doorbell registers 520 may include an implicit counter. In some cases, an implicit counter may prevent a race condition in which a target processor is attempting to clear the implicit counter while a source processor is setting the implicit counter. As one example, IPC unit 510 may write '1' to a least significant bit (LSB) of doorbell register group 521 (e.g., function register 524). By writing to function register 524 of doorbell register group 521, the counter may be increased by 1. Implicit counter may saturate to a maximum value of '1.' In other words, writing to the function register of a doorbell register group with 'LSB=1'b1' while the implicit counter is set to '1' might not change the implicit counter, since the implicit counter is already set to '1.' When the implicit counter is larger than 0, the function register outputs an interrupt request to the respective target processor. In some examples, writing to the function register of a doorbell register group with 'LSB=1'b0' decreases the implicit counter from '1' to '0.' The implicit counter may saturate to a '0' value, meaning that the implicit counter might not go below '0.'

In some examples, an interrupt is raised when there are no errors (e.g., in a normal operation). An error may be logged in error registers (e.g., 'ERR_STATUS' and 'ERR_DATA' registers) if a processor does not have permission to access the doorbell register. Then, an error interrupt will be raised when the ERR_STATUS register is not empty. In some cases, read data 0x0 may be returned if a source processor does not have read permission. The 'ERR_STATUS' may register content including, for example, '[0]=valid,' '[2:1]=error code,' '[11:3]=reserved,' '[19:12]=initiator role ID,' '[31:20]=address offset' for 'ERR_STATUS' register and '[31:0]=data' for 'ERR_DATA' register. In some examples, mutex registers 512 may provide mutual exclusion to control access by SoCs 502 to shared resource 506 or other shared resources, such as a portion of memory or an I/O device. Mutex registers 512 may include a set of mutexes, where each mutex of the set of mutexes may control access to a different shared resource. One or more processes executed by one or more processors may use shared resources protected by mutexes in mutex registers 512. A mutex of mutex registers 512 may indicate ownership (or no ownership) of the mutex by, for example, association with a single process running on a processor. The mutex may store a unique ID associated with the owner of the mutex, and allow only the owner to release the mutex from ownership. For example, an owner of a mutex may be defined with both a software identifier (SWID) of a process and a hardware identifier (HWID) of the processor executing the process. The SWID may be defined by software. Hardware-ID may be given by security processor 526 according to a protocol. HWID may represent an interrupt initiator ID, a transaction identifier in the AXI specification (AxID), and/or a role ID and may match the protocol used by the mutex register. An example mutex register including HWID is shown below:

| Security Register Address | Register Name | Register width (bit) | Comment |
| --- | --- | --- | --- |
| 0x0000 | OWNER_ROLEID #0 | 8 | Hardware ID of current owner CPU for mutex register #0, #1, and so on. |
| 0x0004 | OWNER_ROLEID #1 | 8 | |
| ... | ... | | |

Each mutex register is associated with a 32-bit function register that is a writable register having a value and an SWID associated with a process. An example of the function register is shown below:

| Function Register Address | Register Name | Register width (bit) | Comment |
| --- | --- | --- | --- |
| 0x1000 | MUTEX #0 | 32 | Mutex register #0, #1, and so on. |
| 0x1004 | MUTEX #1 | 32 | |
| ... | ... | | |

For ease of illustration, only a single mutex register 513 is illustrated in FIG. 5A. In the example of FIG. 5A, to exclusively use a shared resource 506, a first process running on a first processor (e.g., processor 504A of SoC 502A) may acquire ownership of a mutex corresponding to shared resource 506. To acquire ownership of the mutex corresponding to shared resource 506, the first process running on first processor 504A attempts to write, using a memory access request via NoC 536, a first value (e.g., '1') and an SWID associated with the first process to mutex registers 512. The first processor 504A inserts an HWID of processor 504A into the memory access request. If the first process succeeds in acquiring ownership of a mutex (e.g., because no other process owns a mutex corresponding to shared resource 506), IPC unit 510 stores the value, the SWID of the first process, and the HWID of the first processor 504A in mutex register 513 of mutex registers 512. For example, IPC unit 510 may write mutex register 513 with data field 514 given by 'Bit [31]=1'b1,' data field 515 given by 'Bit [30:0]=SWID' that is defined by a software protocol. Mutex 513 may also include data field 516 specifying the HWID of the first processor 504A. If first process fails to acquire the mutex (e.g., because another process owns the mutex), no error will be returned.

The first process may then read the data in mutex 513. If an SWID of the first process does not match the SWID of mutex 513 corresponding to shared resource 506, then the first process does not own the mutex and cannot use shared resource 506. If the SWID associated with the first process matches the SWID of mutex 513, the first process owns the mutex and can use shared resource 506.

After the owner is done using the shared resource, only the owner may release the mutex from ownership by the process. For example, only the first process may release mutex 513 from ownership. To release mutex 513 and shared resource 506, the first process may issue, via NoC 508, a memory access request to write a second value (e.g., '0') to mutex 513 stored in mutex registers 512 in order to clear it. For example, IPC unit 510 may write mutex 513 with data field 514 given by 'Bit [31]=1'b0,' data field 515 given by 'Bit [30:0]=SWID' that is defined by a software protocol. In some examples, the HWID and SWID of the write request must match what is stored in the mutex. If a processor having an HWID different than the HWID stored in the mutex attempts to clear a mutex, IPC unit 510 may register an error with security processor 526.

Each mutex of mutex register 512 has one owner or zero owners. When a mutex has no owner, its value may be '0x0,' and the value may be acquired during a subsequent writing operation. In some cases, both acquiring ownership of the mutex and releasing the mutex may be performed with atomic operations in order to avoid racing.

Processors may read from mutex register 512. If there is currently no owner, mutex register 512 returns a 0x0. If there is currently an owner, mutex register 512 returns data field 514 given by Bit [31]=1'b1' and data field 515 given by 'Bit [30:0]=SWID.'

Figure 5B:
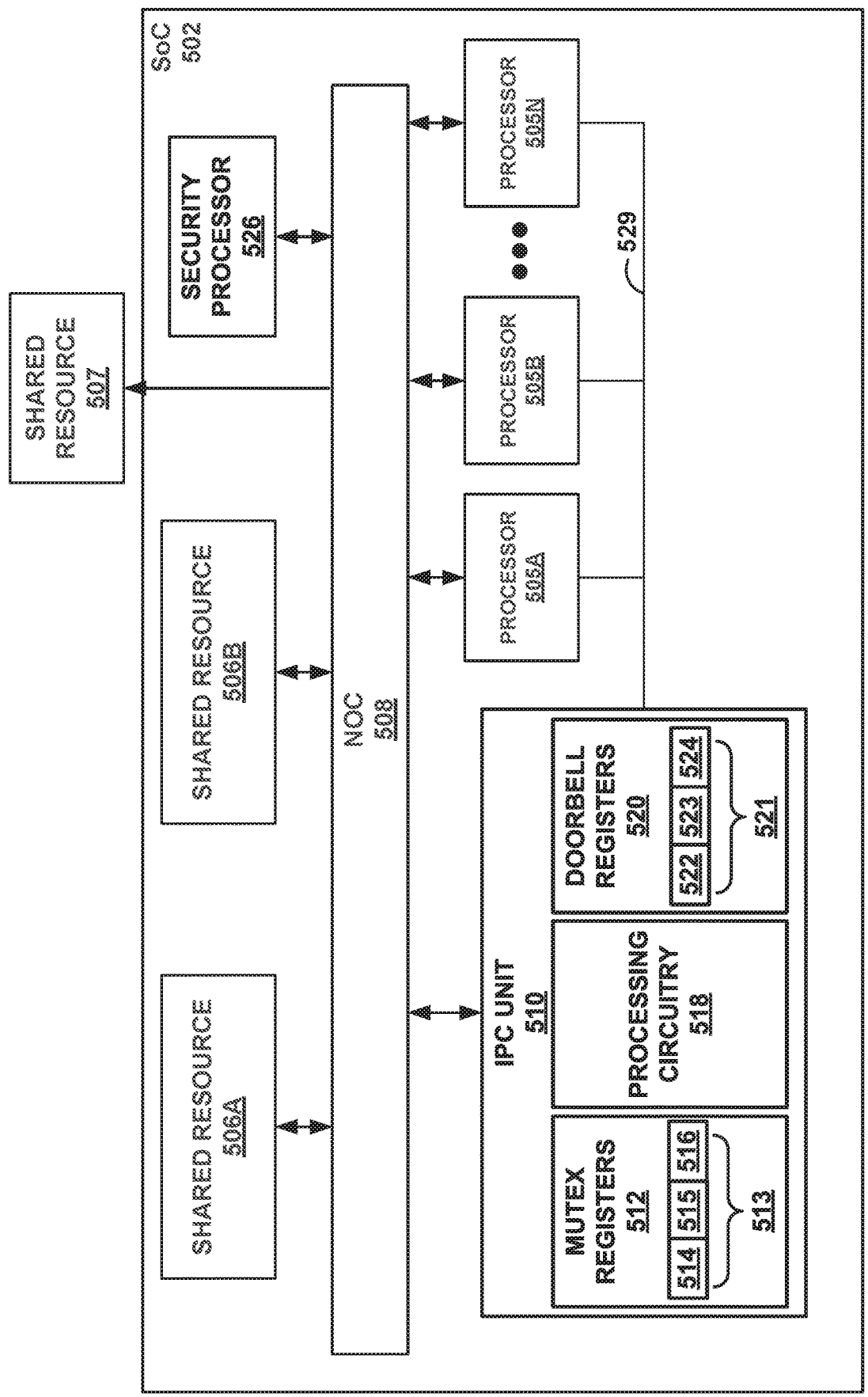
FIG. 5B is a block diagram illustrating an example implementation of an SoC in which multiple processors of the SoC use inter-processor communication, in accordance with the techniques described in this disclosure.
Figure 5C:
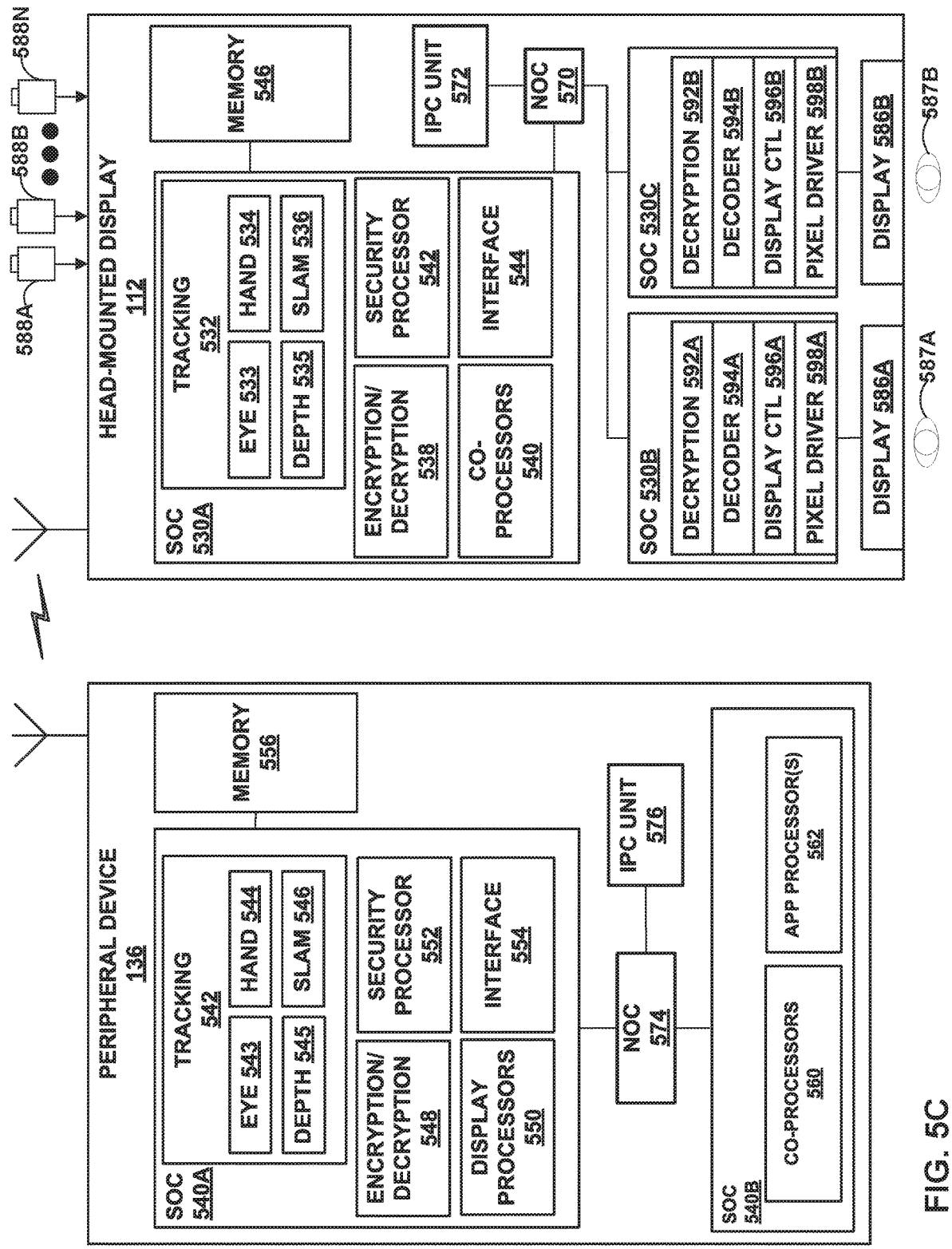
FIG. 5C is a block diagram illustrating a more detailed example implementation of a distributed architecture for a multi-device artificial reality system in which one or more devices (e.g., peripheral device and HMD) are implemented using one or more SoC integrated circuits within each device, in accordance with the techniques described in this disclosure.

FIG. 5B is a block diagram illustrating an example implementation in which multiple computer processors of a single SoC use IPC, in accordance with techniques described in this disclosure. Similar to the example described in FIG. 5A, each of the processors 505A-505N of SoC 502 may use registers of the IPC unit 510 to (1) initiate an interrupt request for a target processor or (2) to acquire a lock for a shared resource (e.g., memory, I/O device).

In this example, doorbell registers 520 facilitate IPC between processors 505A-505N (collectively, "processors 505") of a single SoC, e.g., SoC 502. Processors 505 are connected by interrupt request lines 529 to receive interrupt signals from IPC unit 510. Mutex registers 512 protect access to on-chip shared resources 506A-506B and/or off-chip resource 507.

FIG. 5C is a block diagram illustrating a more detailed example implementation of a distributed architecture for a multi-device artificial reality system in which one or more devices (e.g., peripheral device 136 and HMD 112) provide inter-processor communication mechanisms, in accordance with the techniques described in this disclosure. As described, peripheral device 136 and HMD 112 are architected and configured to provide IPC mechanisms for SoCs 502A-502B and SoCs 530A-530C, respectively.

In general, the SoCs illustrated in FIG. 5B represent a collection of specialized integrated circuits arranged in a distributed architecture, where each SoC integrated circuit includes various specialized functional blocks configured to provide an operating environment for artificial reality applications. FIG. 5C is merely one example arrangement of SoC integrated circuits. The distributed architecture for a multi-device artificial reality system may include any collection and/or arrangement of SoC integrated circuits for providing an artificial reality environment.

In this example, SoC 530A of HMD 112 comprises functional blocks including tracking 532, an encryption/decryption 538, co-processors 540, security processor 542, and one or more interfaces 544. The functional blocks of SoC 530A may use memory 546 to store various data for the artificial reality content. Memory 546 may represent dynamic random-access memory (DRAM), synchronous DRAM (SDRAM), static RAM (SRAM), or other types of memory to store data. While illustrated with SoC 530A interconnected to SoCs 530B, 530C, and IPC unit 572 via NoC 570, SoC 530A may include an NoC by which functional blocks of SoC 530A may communicate with one another and with an IPC unit of SoC 530A.

Tracking 532 provides a functional block for eye tracking 533 ("eye 533"), hand tracking 534 ("hand 534"), depth tracking 535 ("depth 535"), and/or Simultaneous Localization and Mapping (SLAM) 536 ("SLAM 536"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 136 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 538 is a functional block to encrypt outgoing data and decrypt incoming data communicated from peripheral device 136 or other devices. Encryption/decryption 538 may support symmetric key cryptography to encrypt/decrypt data.

Co-application processors 540 includes various processors such as a video processing unit, graphics processing unit, digital signal processors, encoders and/or decoders, and/or others.

Security processor 542 may provide secure device attestation and mutual authentication of HMD 112 when pairing with devices, e.g., peripheral device 136, used in conjunction within the AR environment.

Interfaces 544 includes interfaces for connecting to functional blocks of SoC 530A. As one example, interfaces 544 may include peripheral component interconnect express (PCIe) slots. SoC 530A may connect with SoC 530B, 530C using interfaces 544. SoC 530A may connect with a communication device (e.g., radio transmitter) using interfaces 544 for communicating with other devices, e.g., peripheral device 136.

SoCs 530B and 530C each represents display controllers for outputting artificial reality content on respective displays, e.g., displays 586A, 586B (collectively, "displays 586"). In this example, SoC 530B may include a display controller for display 568A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 568B to output artificial reality content for a right eye 587B of the user. For example, SoC 530C includes decryption 592B, decoder 594B, display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 136 includes SoCs 540A and 540B configured to support an artificial reality application. In this example, SoC 540A comprises functional blocks including tracking 542, an encryption/decryption 548, one or more display processors 550, security processor 552, and one or more interfaces 554. The functional blocks of SoC 540A may use memory 556 to store various data for the artificial reality content. Memory 556 may represent dynamic random-access memory (DRAM), synchronous DRAM (SDRAM), static RAM (SRAM), or other types of memory to store data. While illustrated with SoC 540A interconnected to SoC 502B and IPC unit 576 via NoC 574, SoC 540A may include an NoC by which functional blocks of SoC 540A may communicate with one another and with an IPC unit of SoC 540A.

Tracking 542 is a functional block providing eye tracking 543 ("eye 543"), hand tracking 544 ("hand 544"), depth tracking 545 ("depth 545"), and/or Simultaneous Localization and Mapping (SLAM) 546 ("SLAM 546"). For example, peripheral device 136 may receive input from one or more accelerometers (also referred to as inertial measurement units or "IMUS") that output data indicative of current acceleration of peripheral device 136, GPS sensors that output data indicative of a location of peripheral device 136, radar or sonar that output data indicative of distances of peripheral device 136 from various objects, or other sensors that provide indications of a location or orientation of peripheral device 136 or other objects within a physical environment. Peripheral device 136 may in some examples also receive image data from one or more image capture devices, such as video cameras, laser scanners, Doppler radar scanners, depth scanners, or the like, configured to output image data representative of the physical environment. Based on the sensed data and/or image data, tracking block 542 determines, for example, a current pose for the frame of reference of peripheral device 136 and, in accordance with the current pose, renders the artificial reality content to HMD 112.

Encryption/decryption 548 encrypts outgoing data and decrypts incoming data communicated from HMD 112 or other devices. Encryption/decryption 548 may support symmetric key cryptography to encrypt/decrypt data using a session key (e.g., secret symmetric key).

Display processors 550 includes processors such as a video processing unit, graphics processing unit, encoders and/or decoders, and/or others, for rendering artificial reality content to HMD 112.

Security processor 552 may provide secure device attestation and mutual authentication of peripheral device 136 when pairing with devices, e.g., HMD 112, used in conjunction within the AR environment.

Interfaces 554 include interfaces for connecting to functional blocks of SoC 540A. As one example, interfaces 554 may include peripheral component interconnect express (PCIe) slots. SoC 540A may connect with SoC 540B using interfaces 554. SoC 540A may connect with one or more communication devices (e.g., radio transmitter) using interfaces 554 for communicating with other devices, e.g., HMD 112.

SoC 510B includes co-application processors 560 and one or more application processors 562. In this example, co-application processors 560 includes various processors, such as a vision processing unit (VPU), a graphics processing unit (GPU), and/or central processing unit (CPU). Application processors 562 may include a processing unit for executing one or more artificial reality applications to generate and render, for example, a virtual user interface to a surface of peripheral device 136 and/or to detect gestures performed by a user with respect to peripheral device 136.

As described with respect to the example of FIGS. 5A and 5B, IPC unit 572 may provide inter-processor communication for processors of SoCs 530. For example, IPC unit 572 includes doorbell registers used to generate an interrupt for doorbell. Alternatively, or additionally, IPC unit 572 includes a mutex register to control mutual exclusive access to shared resources, e.g., memory 546 or peripheral device 136. NoC 570 is a communication infrastructure comprising shared busses between components of SoCs 530. For example, NoC 570 and IPC unit 572 may be components of SoC 530A for interconnecting tracking 532, encryption/decryption 548, co-processors 540, security processor 542, and other components of SoC 530A.

Similarly, IPC unit 576 may provide inter-processor communication for processors of SoCs 540. For example, IPC unit 576 includes doorbell registers used to generate an interrupt for doorbell. Alternatively, or additionally, IPC unit 576 includes a mutex register to control mutual exclusive access to shared resources, e.g., memory 546 or peripheral device 136. NoC 574 is a communication infrastructure comprising shared busses between components of SoC 540. For example, NoC 575 and IPC unit 576 may be components of SoC 540A for interconnecting tracking 542, encryption/decryption 548, display processors 550, security processor 552, and other components of SoC 540A.

Figure 6A:
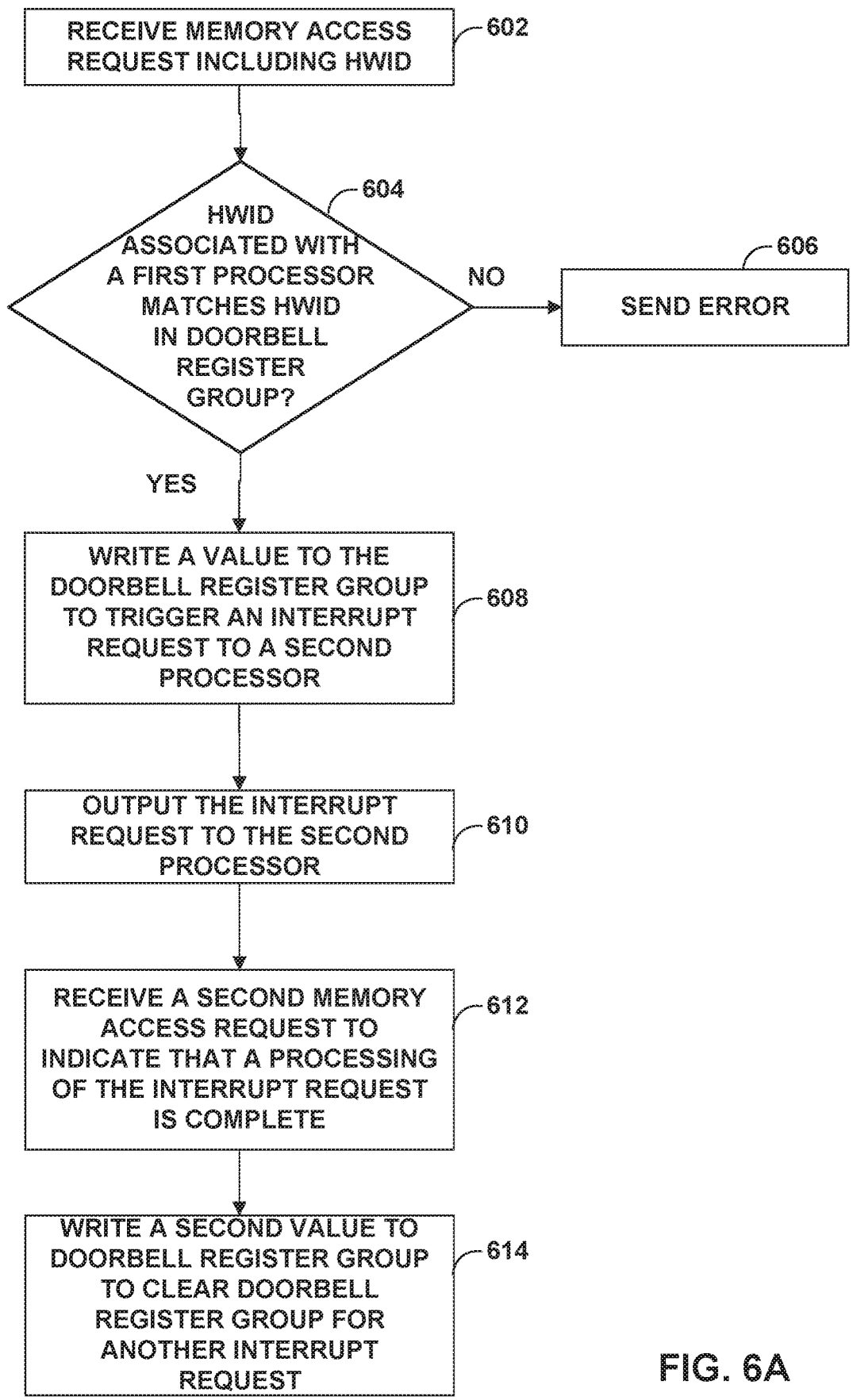
FIGS. 6A-6B are flow diagrams illustrating example operations for inter-processor communication, in accordance with one or more techniques of this disclosure.
Figure 6B:
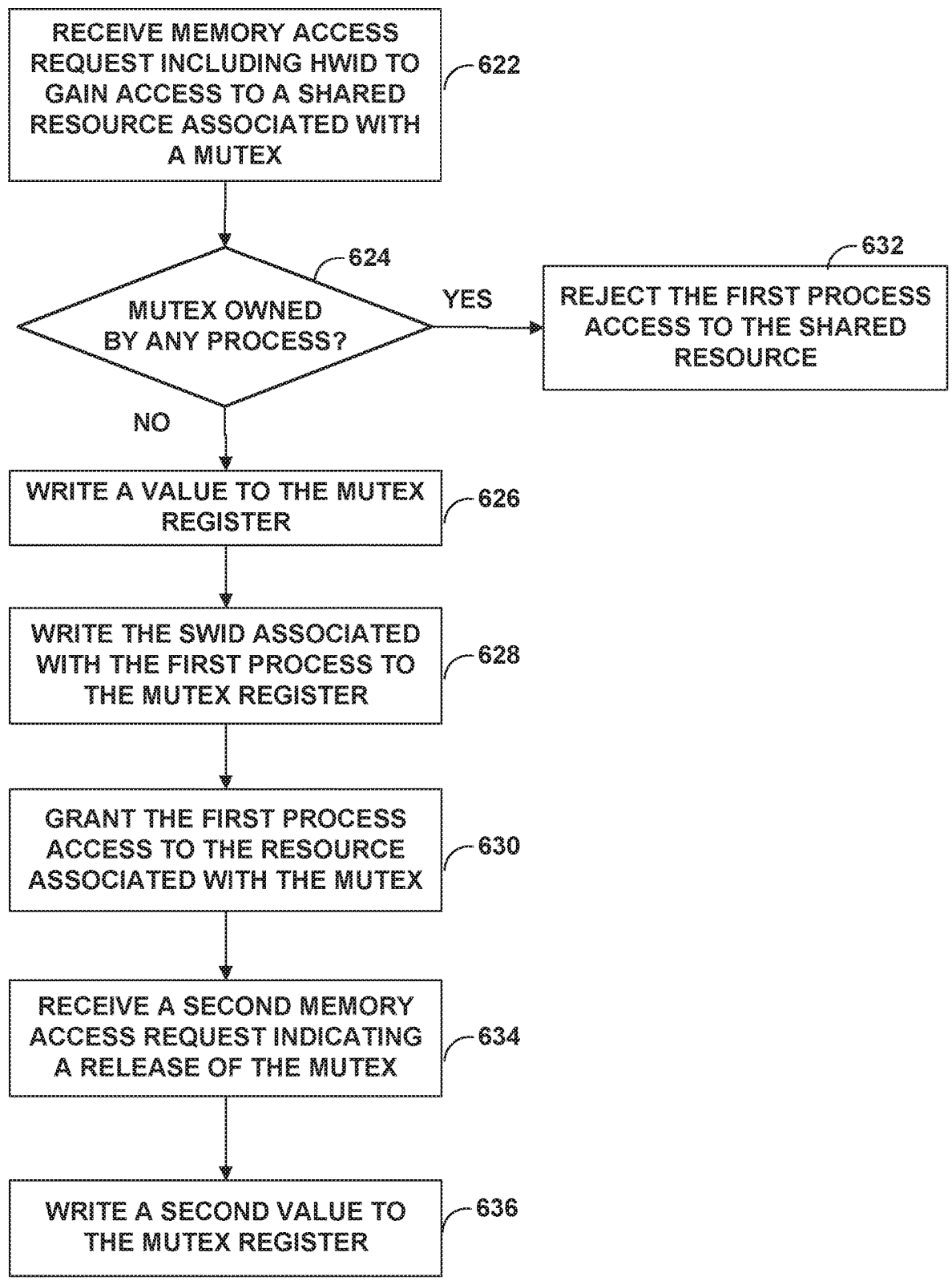

FIGS. 6A-6B are example flow diagrams illustrating example operations for inter-processor communication, in accordance with one or more techniques of this disclosure. For example, FIG. 6A is a flow diagram illustrating an example operation for initiating an interrupt request for a target processor, in accordance with one or more techniques of this disclosure. FIG. 6B is a flow diagram illustrating an example operation for acquiring ownership of a mutex and releasing the mutex from an ownership, in accordance with one or more techniques of this disclosure. FIGS. 6A-6B are described with respect to artificial reality system 500 of FIGS. 5A-5B. However, the techniques of FIGS. 6A-6B may be performed by different components of artificial reality system 500 or by additional or alternative devices.

In the example of FIG. 6A, IPC unit 510 receives, via NoC 508, a memory access request from a first processor (e.g., a source processor), such as processor 504A of device 502 of artificial reality system 500 (602). Processor 504A may represent a processor of SoCs of HMD 112, peripheral device 136, or any device of the artificial reality system. The memory access request may include information indicative of a hardware identifier (HWID) associated with the source processor.

IPC unit 510 determines whether the HWID associated with the source processor matches an HWID for doorbell register group 521 of doorbell register 520 of IPC unit 510 (604). As described above, a security processor may configure, for example, at initial boot, a source processor, target processor pair for doorbell register group 521 of doorbell register 520. If the HWID of the memory access request does not match the HWID in doorbell register group 521 ("NO" branch of 604), IPC unit 510 returns, via NoC 508, an error message to the source processor that indicates that IPC unit 510 rejects the memory access request (606). In some examples, IPC unit 510 outputs, to a security processor via NoC 508, information indicative of a record of the error message returned to the source processor.

If the HWIDs match ("YES" branch of 604), IPC unit 510 writes a value to doorbell register group 521 of doorbell register 520 to trigger an interrupt request to a second processor (e.g., target processor 504B) for the doorbell register group 521 as being linked to the source processor (608). For example, IPC unit 510 may write a value of '1' to a function register 524 of doorbell register group 521, which triggers, via interrupt request line 529, an interrupt request to the target processor 504B to indicate a communication from the source processor 504A to target processor 504B (610).

IPC unit 510 may receive, via NoC 508, a second memory access request from target processor 504B (612). The second memory request may indicate that a processing of the interrupt request is complete. IPC unit 510 then writes a second value to the function register 524 of doorbell register group 521 in order to clear doorbell register group 521 for another interrupt request (614). For example, IPC unit 510 may write a value of '0' to function register 524 of doorbell register group 521.

FIG. 6B is a flow diagram illustrating an example operation for acquiring ownership of a mutex and releasing the mutex from an ownership, in accordance with one or more techniques of this disclosure. In the example of FIG. 6B, IPC unit 510 receives, via NoC 508, a memory access request from a first processor, such as processor 504A of device 502 of artificial reality system 500 (622). Processor 504A may represent a processor of HMD 112, peripheral device 136, or any device of the artificial reality system. The memory access request represents a request to gain access to a shared resource associated with a mutex, such as shared resource 506. The memory access request may include information indicative of a software identifier (SWID) associated with a process (e.g., first process) of a first processor. For example, the memory access request may include the values '{1'b1, SWID},' where '1'b1' may cause IPC unit 510 to write the value '1' to a mutex register 513 of mutex registers 512 and SWID' may represent the SWID of the first process. IPC unit 510 may write the SWID of the first process to the mutex register 513 of mutex registers 512, indicating that the first process owns the mutex object for shared resource 506. When sending the memory access request, the first processor may also include an HWID associated with the first processor.

IPC unit 510 determines whether the mutex is owned by any process (624) and, based on whether the mutex is owned by any process, controls access to the shared resource. If IPC unit 510 determines that the mutex is not owned by any process ("NO" branch of 624), IPC unit 510 writes a value (e.g., '1') to the mutex register 513 of mutex registers 512 (626) to indicate that the mutex associated with the shared resource 206 is owned by a process (e.g., first process) and writes the SWID associated with the first process to mutex register 513 of mutex registers 512 to indicate that the mutex is owned by the first process (628).

To control access to the shared resource by a process, IPC unit 510 determines whether the mutex is owned by the process requesting access. For example, IPC unit 510 compares the SWID included in the memory access request with an SWID stored in mutex register 512. Based on the comparison of the SWIDs, IPC unit 510 determines whether to grant the process access to the resource associated with the mutex (630). For example, if the SWID included in the memory access request matches the SWID stored in mutex register 512, IPC unit 510 grants the first process access to the shared resource (e.g., memory 506) associated with the mutex.

If IPC unit 510 determines that the mutex is owned by another process ("YES" branch of 624), such as if the SWID included in the memory access request does not match the SWID stored in mutex register 512, IPC unit 510 denies the process access to the shared resource associated with the mutex (632).

Mutex register 512 may subsequently receive, via NoC 508, a second memory access request indicating a release of the mutex from being owned by the first process (634). In this example, IPC unit 510 writes a second value to mutex register 512 in order to release the mutex from being owned by the first process. For example, IPC unit 510 may write '{1'b0, SWID}' to the mutex register 512, thus releasing the mutex object from ownership by the first process.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:
1. An artificial reality system comprising:
a plurality of processors;
an inter-processor communication (IPC) unit comprising a register, wherein the the IPC unit is configured to:
receive a memory access request from a first processor of the processors, wherein the memory access request includes information indicative of a hardware identifier (HWID) associated with the first processor;
determine whether the HWID associated with the first processor matches an HWID for the register of the IPC unit; and
permit, based on determining that the HWID associated with the first processor matches the HWID for the register of the IPC unit, the memory access request to indicate a communication from the first processor to at least one other processor.

2. The artificial reality system of claim 1, further comprising:
a head-mounted display comprising one or more processors configured to output artificial reality content, and
a peripheral device comprising processors configured to receive one or more inputs from a user of the artificial reality system.

3. The artificial reality system of claim 1,
wherein the register of the IPC unit comprises a doorbell register, and wherein, to permit the memory access request to indicate the communication, and
wherein the IPC unit is further configured to write a value to the doorbell register in order to trigger, via an interrupt line, an interrupt request to a second processor, wherein the first processor represents a source processor for the doorbell register and the second processor represents a target processor for the doorbell register.

4. The artificial reality system of claim 3,
wherein the doorbell register is one of a set of doorbell registers,
wherein each doorbell register of the set of doorbell registers is associated with a different pair of a target processor of the processors and source processor of the processors and is connected to an interrupt line to the target processor of the associated pair to trigger the interrupt request.

5. The artificial reality system of claim 3,
wherein the value represents a first value, wherein the memory access request represents a first memory access request, and
wherein the IPC unit is further configured to:
receive a second memory access request from the second processor indicating that a processing of the interrupt request by the second processor is complete; and
write a second value to the doorbell register to clear the doorbell register for another interrupt request.

6. The artificial reality system of claim 1,
wherein the register of the IPC unit comprises a doorbell register, and wherein in response to determining that the HWID associated with the first processor does not match the expected HWID for the doorbell register, and
wherein the IPC unit is further configured to return an error message to the first processor indicating that the IPC unit rejected the memory access request.

7. The artificial reality system of claim 1,
wherein the register of the IPC unit comprises a doorbell register, and
wherein in response to determining that the HWID associated with the first processor does not match the expected HWID for the doorbell register, the IPC unit is further configured to output, to a security processor of the processors, information indicating that the IPC unit rejected the memory access request.

8. The artificial reality system of claim 1, further comprising:
a shared resource,
wherein the register of the IPC unit comprises a mutex register for a mutex for the shared resource,
wherein the first processor is configured to execute a first process,
wherein the memory access request includes information indicative of a software identification (SWID) associated with the first process,
wherein, to permit the memory access request, the IPC unit is further configured to permit, based on determining the mutex register is not owned, the memory access request to acquire the mutex for the first process.

9. The artificial reality system of claim 8, wherein, to acquire the mutex for the first process, the IPC unit is configured to:
write a value to the mutex register to indicate the mutex has an owner; and
write the SWID associated with the first process to the mutex register to indicate that the mutex is owned by the first process.

10. The artificial reality system of claim 8,
wherein the memory access request is a first memory access request,
wherein the value represents a first value, and
wherein the IPC unit is further configured to:
receive a second memory access request from the first process, the second memory access request indicating a release of the mutex; and
write a second value to the mutex register in order to release the mutex from being owned by the first process.

11. The artificial reality system of claim 8,
wherein the memory access request is a first memory access request,
wherein the IPC unit is further configured to receive a second memory access request to read the mutex register and to output a value for the mutex register that includes a stored SWID value,
wherein the first processor is configured to, in response to determining the stored SWID value matches the SWID associated with the first process, access the shared resource.

12. The artificial reality system of claim 11,
wherein the first processor is configured to, in response to determining the stored SWID value matches the SWID associated with the first process and determining the mutex is owned by a process, access the shared resource.

13. The artificial reality system of claim 8,
wherein the memory access request is a first memory access request,
wherein the IPC unit is further configured to receive a second memory access request to read the mutex register and to output a value for the mutex register that includes a stored SWID value,
wherein a second processor of the processors is configured to, in response to determining the stored SWID value does not match a SWID associated with a process executing on the second processor, eschew accessing the shared resource.

14. A method for inter-processor communication (IPC), the method comprising:
receiving a memory access request from a first processor of a plurality of processors, wherein the memory access request includes information indicative of a hardware identifier (HWID) associated with the first processor;
determining whether the HWID associated with the first processor matches an HWID for the register of the IPC unit; and
permitting, based on determining that the HWID associated with the first processor matches the HWID for the register of the IPC unit, the memory access request to indicate a communication from the first processor to at least one other processor.

15. The method of claim 14, wherein the register of the IPC unit comprises a doorbell register, and wherein permitting the memory access request to indicate the communication comprises:

writing a value to the doorbell register in order to trigger, via an interrupt line, an interrupt request to a second processor, wherein the first processor represents a source processor for the doorbell register and the second processor represents a target processor for the doorbell register.

16. The method of claim 15, wherein the value represents a first value, wherein the memory access request represents a first memory access request, and wherein the method further comprises:

receiving a second memory access request from the second processor indicating that a processing of the interrupt request by the second processor is complete; and writing a second value to the doorbell register to clear the doorbell register for another interrupt request.

17. The method of claim 14, wherein the register of the IPC unit comprises a mutex register for a mutex for a shared resource, wherein the first processor is configured to execute a first process, wherein the memory access request includes information indicative of a software identification (SWID) associated with the first process, and wherein permitting the memory access request comprises permitting, based on determining the mutex register is not owned, the memory access request to acquire the mutex for the first process.

18. The method of claim 17, wherein to acquire the mutex for the first process, the method further comprises:

writing a value to the mutex register to indicate the mutex has an owner; and writing the SWID associated with the first process to the mutex register to indicate that the mutex is owned by the first process.

19. The method of claim 18, wherein the memory access request is a first memory access request, wherein the value represents a first value, and wherein the method further comprises:

receiving a second memory access request from the first process, the second memory access request indicating a release of the mutex; and writing a second value to the mutex register in order to release the mutex from being owned by the first process.

20. A non-transitory computer-readable storage medium comprising instructions that, when executed, configure processing circuitry to:

receive a memory access request from a first processor of a plurality of processors, wherein the memory access request includes information indicative of a hardware identifier (HWID) associated with the first processor;

determine whether the HWID associated with the first processor matches an HWID for the register of the IPC unit; and permit, based on determining that the HWID associated with the first processor matches the HWID for the register of the IPC unit, the memory access request to indicate a communication from the first processor to at least one other processor.

\* \* \* \* \*